United States Patent
Roba et al.

(10) Patent No.: US 7,814,767 B2
(45) Date of Patent: Oct. 19, 2010

(54) METHOD AND INDUCTION FURNACE FOR DRAWING LARGE DIAMETER PREFORMS TO OPTICAL FIBRES

(75) Inventors: Giacomo Stefano Roba, Monza (IT); Massimo Nutini, Milan (IT); Franco Veronelli, Lainate (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 65 days.

(21) Appl. No.: 09/986,622

(22) Filed: Nov. 9, 2001

(65) Prior Publication Data
US 2002/0088253 A1     Jul. 11, 2002

Related U.S. Application Data

(63) Continuation of application No. PCT/EP00/04134, filed on May 9, 2000.

(60) Provisional application No. 60/134,066, filed on May 13, 1999.

(51) Int. Cl.
*C03B 37/023*     (2006.01)
*C03B 37/07*      (2006.01)

(52) U.S. Cl. ............... 65/503; 65/510; 65/538; 65/509; 65/513; 65/533; 219/649; 219/651; 373/139; 373/140

(58) Field of Classification Search ............ 65/509, 65/513, 533, 435, 503, 510, 538; 219/649, 219/651; 373/139, 140
See application file for complete search history.

(56) References Cited

U.S. PATENT DOCUMENTS

| | | | | |
|---|---|---|---|---|
| 3,233,990 A | * | 2/1966 | Stephens et al. | 65/460 |
| 3,540,870 A | * | 11/1970 | Li | 65/529 |
| 3,793,812 A | * | 2/1974 | Willis | 55/338 |
| 4,030,901 A | * | 6/1977 | Kaiser | 65/424 |
| 4,142,063 A | | 2/1979 | Boniort et al. | 13/27 |

(Continued)

FOREIGN PATENT DOCUMENTS

DE     3025680 A1     2/1982

(Continued)

OTHER PUBLICATIONS

English translation of JP08091862.*

(Continued)

*Primary Examiner*—John Hoffmann
(74) *Attorney, Agent, or Firm*—Finnegan, Henderson, Farabow, Garrett & Dunner, L.L.P.

(57) ABSTRACT

An induction furnace capable of drawing large diameter preforms of up to 130 mm is described. The induction furnace has top and bottom chimneys surrounding the entire preform during operation of the furnace with an inert conditioning gas which is introduced into the top chimney and flows downward through the furnace body and bottom chimney without significant turbulence. A distributor ring inside the top chimney redirects flow from a circumferential direction to a downward direction. The top chimney also includes a resilient seal to releasably hold the top of the preform. The bottom chimney has a smoothly decreasing cross-sectional area preventing turbulence at the furnace exit. The furnace insulation is preferably a rigid self-supporting graphite cylinder. A method of drawing large diameter preforms either to an optical fiber or to a preform of smaller diameter using such a furnace is also described.

19 Claims, 7 Drawing Sheets

U.S. PATENT DOCUMENTS

| | | | |
|---|---|---|---|
| 4,154,592 A | 5/1979 | Bailey | 65/2 |
| 4,174,462 A | 11/1979 | Pearce | 13/26 |
| 4,400,180 A | 8/1983 | Marion et al. | 48/197 |
| 4,400,190 A | 8/1983 | Briere | 65/13 |
| 4,450,333 A | 5/1984 | Andrejco et al. | 219/10.49 |
| 4,452,578 A * | 6/1984 | Levine et al. | 239/463 |
| 4,477,274 A | 10/1984 | Janssen et al. | 65/13 |
| 4,547,644 A | 10/1985 | Bair et al. | 219/10.49 |
| 4,565,082 A * | 1/1986 | Heath et al. | 72/45 |
| 4,608,473 A * | 8/1986 | Paek et al. | 65/509 |
| 4,643,750 A * | 2/1987 | Glaser | 65/474 |
| 4,678,490 A * | 7/1987 | Miller et al. | 65/521 |
| 4,682,475 A * | 7/1987 | Nelson | 62/354 |
| 4,735,826 A | 4/1988 | Roba | 427/237 |
| 4,988,374 A * | 1/1991 | Harding et al. | 65/435 |
| 5,017,209 A | 5/1991 | Yoshimura | 65/13 |
| 5,160,359 A * | 11/1992 | Strackenbrock et al. | 65/434 |
| 5,284,499 A * | 2/1994 | Harvey et al. | 65/435 |
| 5,308,947 A * | 5/1994 | Fleming, Jr. | 219/634 |
| 5,410,567 A * | 4/1995 | Brundage et al. | 373/137 |
| 5,545,246 A | 8/1996 | Lysson et al. | 65/435 |
| 5,637,130 A * | 6/1997 | Nagayama et al. | 65/435 |
| 5,848,093 A * | 12/1998 | Goudeau et al. | 373/157 |
| 5,897,681 A * | 4/1999 | Lysson et al. | 65/435 |
| 5,897,682 A * | 4/1999 | Koaizawa et al. | 65/489 |
| 6,264,900 B1 * | 7/2001 | Schubert et al. | 422/224 |
| 6,474,109 B1 * | 11/2002 | deFouw et al. | 65/435 |
| 2002/0029591 A1 * | 3/2002 | Dickinson, Jr. et al. | 65/379 |

FOREIGN PATENT DOCUMENTS

| | | |
|---|---|---|
| DE | 3731345 A1 | 3/1989 |
| DE | 39 03 466 A1 | 8/1990 |
| DE | 40 06 839 A1 | 9/1991 |
| EP | 0 329 898 | 8/1989 |
| EP | 0 743 289 A1 | 11/1996 |
| EP | 0 795 519 A1 | 9/1997 |
| EP | 0 803 478 A1 | 10/1997 |
| EP | 0 849 232 A1 | 6/1998 |
| EP | 0 867 412 A1 | 9/1998 |
| EP | 0 893 416 A1 | 1/1999 |
| FR | 2 249 847 | 5/1975 |
| FR | 2 340 519 | 9/1977 |
| FR | 2 368 677 | 5/1978 |
| GB | 1 521 231 | 8/1978 |
| GB | 1523595 | 9/1978 |
| GB | 1 575 299 | 9/1980 |
| GB | 2 212 151 | 7/1989 |
| IT | 1077118 | 1/1977 |
| JP | 53072634 | 6/1978 |
| JP | 58-104032 | 6/1983 |
| JP | 62246837 | 10/1987 |
| JP | 01192741 | 8/1989 |
| JP | 04182331 | 6/1992 |
| JP | 08091862 | 4/1996 |

OTHER PUBLICATIONS

U.C. Paek et al., "Fiber Drawing From 735 cm Diameter Preforms At High Speed", AT&T Engineering Research Center, pp. 222-225, 1988.

Markku Rajala et al., "Combination Furnace for Drawing Large Optical IBRE Preforms At High Speed", International Wire & Cable Symposium Proceedings, pp. 483-488, 1998.

Y. Tokuoka, "Drawing for Optical Fiber Glass Matrix", Patent Abstracts of Japan of JP 06239639, published Aug. 30, 1994.

K. Kobayashi"Furnace for Drawing Optical Fiber", Patent Abstracts of Japan of JP 08188440, published Jul. 23, 1996.

M. Akira et al., "Ultrasonic Flaw Detection Apparatus", Patent Abstracts of Japan of JP 03-057955, published Mar. 13, 1991.

* cited by examiner

METHOD AND INDUCTION FURNACE FOR DRAWING LARGE DIAMETER PREFORMS TO OPTICAL FIBRES

CROSS REFERENCE TO RELATED APPLICATIONS

This application is a continuation of international application number PCT/EP00/04134, filed May 9, 2000, the content of which is incorporated herein by reference, and claims the priority of European Patent Application No. 99109154.7, filed May 10, 1999, and the benefit of U.S. Provisional Application No. 60/134,066, filed May 13, 1999, the content of which is incorporated herein by reference.

BACKGROUND OF THE INVENTION

1. Field of the Invention

The present invention relates to a furnace for and method of drawing optical fibers and specifically to a graphite induction furnace for drawing optical fibers from large glass preforms and method for drawing optical fiber or smaller diameter preforms from such large-diameter preforms.

2. Description of the Related Art

Furnace designed for drawing optical fibers may be divided into two main categories, defined by the method of heating, which can be conductive heating or inductive heating. Inductive heating furnace are generally preferred, mainly because of their flexibility of use. Induction furnaces may then be further categorized as using heating elements made of graphite or of zirconia.

These furnaces generally comprise a cylindrical susceptor (either graphite or zirconia), defining the heating zone of the furnace, surrounded by insulating material which is in turn surrounded by an induction coil. When the coil is energized, an electromagnetic field is generated which couples to the susceptor (generally preheated) increasing the temperature thereof and generating the desired hot zone for melting the preform inserted into the cylindrical susceptor. Extension, in the form of cylindrical tubes, may be provided on the top (the so-called top-chimney) and/or on the bottom (the so-called bottom chimney) of the heating zone of the furnace.

Graphite furnaces use ultra-pure graphite heating elements. A typical problem with these furnaces is the oxidation of the heating element. The reactivity of the graphite heating element also pollutes the reaction area. Therefore, the life of the heating element is short and frequent replacement of the element is required. These problems are commonly overcome by providing an inert, protective atmosphere inside the furnace. Usually, argon or nitrogen is employed for the purpose. In U.S. Pat. No. 4,154,592 the use of helium as conditioning gas is disclosed. Its high thermal conductivity is helpful for better thermal stability and uniformity in the region close to the tip of the preform.

Several documents have discussed furnaces for drawing optical fiber. For example, IT 1,077,118 describes a high-frequency electric furnace comprising a tubular graphite core enclosing the items to be heated, and in turn enclosed by an induction winding to which high-frequency current is supplied. A housing enclosing the core has a wall composed of sections placed one on top of the other, and inert gas is delivered to the inside of it. The inert gas surrounding the core prevents oxidation of the core while the furnace is in operation. The gas is introduced at the center of the furnace and is allowed to escape between the outer sections. The furnace is capable of operating at temperatures of about 2000° C.

U.S. Pat. No. 4,174,462 describes a large-diameter, general-purpose, graphite induction furnace. No conditioning gas is used in the furnace. Instead, the furnace is kept full of material to avoid oxidation damage to the graphite susceptor. The susceptor is insulated with powdered carbon black. The carbon black is contained within an asbestos and concrete cylinder.

DE 3,025,680 describes a graphite induction furnace for drawing optical fiber. The heating element is coated with a 10-micron-thick protective layer that does not react with glass, even at high temperatures, e.g., platinum or iridium. The coating prevents any material transport between the heating element and the glass.

U.S. Pat. No. 4,154,592 describes a method of forming optical fiber by disposing a preform in a cylindrical muffle. The muffle is heated with a resistance heating element to a temperature sufficient to cause a first end of the blank to reach the drawing temperature of the preform. Fiber is drawn from the first end of the preform while a helium-containing gas flows through the muffle in such a direction that it is exhausted from that end of the muffle from which the filament is being drawn.

U.S. Pat. No. 4,400,190 describes a graphite resistance furnace for drawing optical fiber. The graphite heating element is generally cylindrical with a centrally located heating chamber of reduced cross-sectional area and areas of enlarged diameter on each end of the heating chamber. Inlet and exhaust tubes are inserted into the areas of enlarged diameter. The internal diameter of the centrally located heating chamber and the inner diameters of the inlet and exhaust tubes are substantially equal. The transitions from the centrally located heating chamber to the areas of enlarged diameter within the heating element may be tapered.

One problem associated with open-ended furnaces through which conditioning gas flow, however, is that turbulence around the preform and the newly drawn fiber can cause diameter variations and consequently affect fiber optical performances. One possible cause for such turbulence is the updraft of ambient air, as disclosed in U.S. Pat. No. 5,284,499 and Patent EP 0 329 898, which suggest preventing updraft by inserting a shutter at the bottom of the furnace.

Another possible cause of turbulence is related to differences in the cross-sectional area of the conditioning gas flow around the preform. U.S. Pat. No. 4,400,180 suggests to minimize this source of turbulence by properly adjusting the ratio between the diameter of the heating element and the diameter of an extension provided to the heating element.

U.S. Pat. No. 5,545,246 suggests to introduce an additional flow of conditioning gas in the draw down zone of the preform, in order to reduce turbulence which may be caused in the conditioning gas flowing along the preform in this zone.

In the article "Combination furnace for drawing large optical fiber preforms at high speed", M. Rajala et al., International Wire & Cables symposium 1998, a graphite induction furnace is disclosed wherein the susceptor is a graphite element having a 80 mm inner diameter.

The other type of furnaces, i.e. induction-heated zirconia furnaces, are of relatively simple construction and their ability to operate in air is a major advantage. Generally, the heating element in induction furnaces is an inert cylinder of $ZrO_2$ stabilized with $Y_2O_3$.

One problem connected with the use of zirconia induction furnaces is the relatively high thermal inertia of zirconia. This results in quite long time intervals between two subsequent drawing operation, as the zirconia susceptor has to be naturally cooled before inserting the new optical preform. As a matter of fact thermal shocks caused by rapid changes in the temperature of the heating element constitute a serious problem for induction heated zirconia furnaces, thus preventing a forced cooling of it in between two subsequent drawing operations. In addition, when, for example, a furnace is shut-down due to a power failure or power supply problem, the zirconia cools through its structural transition, cracks, and must be replaced. This causes the furnace to be out of operation for a large amount of time, because the zirconia susceptor must be heated and stabilized before drawing can be initiated.

U.S. Pat. No. 4,450,333 describes a zirconia induction furnace for drawing fiber from a preform. The furnace has a centrally located tubular susceptor with a thin coating of the preform material (e.g., silica) on at least a portion of its inside surface. The thin coating on the susceptor prevents contaminating particles from migrating from small cracks in the inside surface of the susceptor onto the preform. A cylinder is positioned in concentric, spaced relation about the susceptor and is surrounded by an insulating grain. The cylinder prevents small particles emanating from the insulating grain from being drawn through larger cracks in the susceptor and onto the preform and/or the fiber.

U.S. Pat. No. 4,608,473 describes a zirconia induction furnace for drawing fiber from a silica preform. The furnace includes an axially located tubular zirconium dioxide susceptor. Prior to use, at least a portion of the inside surface of the susceptor is coated with a vapor-deposited silica "soot." The silica soot is then consolidated at an elevated temperature. Such a technique substantially eliminates migration of zirconium dioxide particles from the susceptor to the preform and/or the fiber.

U.S. Pat. No. 5,284,499 describes a zirconia induction furnace for drawing optical fiber. Gases introduced at the top of the furnace form a boundary layer adjacent to the fiber, which passes through the furnace, along with the fiber, into a tube. The tube isolates the fiber from the ambient atmosphere so that the boundary layer of gases established in the furnace remains substantially uniform until the viscosity of the cladding layer of the fiber is high enough to minimize differential stresses around the circumference of the fiber. A planar shutter is positioned at the bottom of the tube to prevent the ambient atmosphere from entering the bottom of the tube.

EP 849 232 describes a zirconia induction furnace for drawing optical fiber. Separate gas supplies inject a conditioning gas into the furnace between the preform and the furnace wall. A first gas supply is provided at the entry end of the furnace space and a second gas supply is provided in the drawing taper region at the exit end.

Other examples of furnaces for drawing optical fiber include: FR 2,368,677, describing a graphite induction furnace having multiple bores through the susceptor; EP 329898 describing an induction furnace with a disk-like shutter closing the bottom end; GB 1,521,231 describing a graphite induction furnace with an inner sleeve of zirconia; GB 1,575,299 describing a graphite induction furnace with a coated susceptor; U.S. Pat. No. 4,142,063 describing a zirconia induction furnace; and U.S. Pat. No. 5,017,209 describing a furnace with a cylindrical heater surrounded by an anisotropic cylindrical insulation.

Commercial furnaces either of the graphite or of the zirconia type, suitable for optical fiber drawing are available, for instance, from the following manufacturers: Astro (USA), Centorr (USA), Heathway (UK), Lepel (USA), Stanelco (UK).

Conventional preforms which may be employed in commercial furnace are typically of about 40-50 mm diameter (when produced according to MCVD—Modified Chemical Vapor Deposition—technology) and up to 70-80 mm (for those produced according to the OVD—Outside Vapor Deposition—or VAD—Vapor Axial Deposition—technology). Based on the preform diameter, conventional susceptor diameters are typically about 70 mm (MCVD preforms) or about 100 mm (OVD or VAD preforms).

The increasing demand of optical fibers requires improvements in optical fiber production process, which improvements may relate to more than one aspect of the process, such as for instance, increase in the drawing speed of the fiber or reduction of the dead-time between one drawing and the subsequent one.

For instance, use of preforms with a diameter larger than the conventional (e.g. 100 mm or more) could increase the productivity of optical fibres, as it would allow to produce longer lengths of optical fiber using a single preform. Typically, the time required between the end of the drawing of a preform and the beginning of the subsequent one is of about 1-2 hours, depending on dimensions and materials of the furnace. By reducing the frequency of interruptions in the drawing process, an increase in optical fiber productivity can be obtained.

SUMMARY OF THE INVENTION

With the aim of developing larger diameter furnaces, the Applicant has however observed some problem associated with a simple scale-up of conventional furnaces, in order to adapt them to receive large diameter preforms.

One problem observed by the Applicant in connection with the heating of large diameter preform in conventional induction furnaces is the turbulence in the conditioning gas and in ambient atmospheric gas entering the furnace. As a matter of fact, in the neck-down zone of the preform, i.e. in the zone where the preform is drawn into an optical fiber, the free space between furnace's walls and preform gradually increases, up to a maximum in correspondence of the zone where the optical fiber is present.

If the diameter of the preform is sufficiently small, the free space in the neck-down zone is quite reduced and turbulence in the flow of conditioning gas may be prevented easier, as suggested by the prior art previously discussed. However, the Applicant has observed that by increasing the diameter of the preform also the free space in the neck-down zone is increased, thus rendering more difficult the control of turbulence in the flow of conditioning gas through the furnace and turbulence caused by unwanted intrusion of ambient atmospheric gases.

The applicant has further observed that the above drawbacks become more evident when the flow rate of conditioning gas through the furnace is increased, in order to meet the requirements connected to increased rates of drawing speed of the optical fiber (e.g. up to about 20 m/s).

As a matter of fact, it is believed (see U.S. Pat. No. 5,284,499) that the conditioning gas flowing around the fiber forms a boundary layer adjacent said fiber, which boundary layer allows a symmetric and gradual cooling of the outer portion of the optical fiber (the so-called cladding), thus preventing differential stresses to be generated on said fiber.

Applicant has however observed that in conventional furnaces, where the flow rate of conditioning gas inside the furnace is of few liter per minute, the conditioning gas has a velocity of only few mm/s at the outlet of said furnace. For instance, in U.S. Pat. No. 5,284,499 the flow rate of the gas inside a furnace of 7 cm internal diameter is of about 3.1 l/min, generating a velocity of about 4 mm/s at the outlet of 1.25 cm diameter. Applicant noticed that this velocity of the gas is very low, as compared with the drawing velocity of the fiber (for instance, of 9 m/s as disclosed in U.S. Pat. No. 5,284,499). Applicant believes that a low gas velocity, in particular in case of relatively high speed of the drawing process (e.g. at about 15 m/s and up to about 20 m/s), may generate undesired disruption of the boundary layer of conditioning gas surrounding the fiber thus causing unwanted asymmetrical cooling of the drawn fiber. In addition, a low velocity of conditioning gas can in some instances not be sufficient to create the necessary overpressure of the gas for avoiding updraft of ambient air from the outside; in particular, when the furnace has an outlet of relatively large diameter, the above velocity of the gas will be further decreased, thus further decreasing the gas pressure which should contrast the updraft of ambient air.

Applicant noticed however that in prior art furnaces no attention is paid to effectively controlling the flow direction of the conditioning gas inside the furnace. According to prior art, (see e.g. U.S. Pat. No. 4,154,592, col. 3, lines 50-54 and U.S. Pat. No. 5,284,499, col. 5, lines 26-33) the gas is in fact introduced into the furnace from its upper end in a direction substantially perpendicular with respect to the preform longitudinal axis and simply allowed to diffuse towards the bottom end, the top end of the furnace being sealed. Other furnaces are known (see, for instance, Japanese patent application (Kokai) no. 01-192741 or GB 2,212,151), having an inlet duct of conditioning gas inclined towards the axis of the preform; as shown in the relevant figures of the above cited documents, said inclination of the inlet ducts is of about 45° with respect to the preform axis. However, notwithstanding said inlet inclination, the gas exiting from the duct is divided into upper and lower flows, as mentioned in the above cited JP Kokai 01-192741, the upper flow of gas acting as a gas seal for sealing the upper end of the furnace.

Applicant has observed that for low flow rate of conditioning gas inside the furnace (as in prior art methods), the absence of an effective control on the direction of the flow of conditioning gas can cause relatively few problems in the transmission of turbulence to the draw down region of the preform. By increasing the speed of the drawing process (e.g. up to about 20 m/s) and by using larger preforms for the drawing process, an increase in the flow rate of conditioning gas inside the furnace would nevertheless be desirable, in order to both increase the velocity of said gas inside the furnace and to enhance the maintenance of the boundary layer of gas adjacent the draw fiber. The applicant has however observed that, in the above conventional furnaces, an increase of the flow rate in order to accordingly increase the velocity of the gas at the outlet, would increase the turbulence of the gas in the inlet zone of the furnace, with the risk that such turbulence being transmitted to the draw down region of the preform, thus causing unwanted diameter variations of the drawn fiber and possible take-up of graphite particulate material generated from the susceptor, which may adhere to the surface of the drawn fiber.

Another problem observed by the Applicant in connection with conventional graphite induction furnaces relates to the graphite insulating material disposed around the susceptor. Said insulating material are generally carbon or graphite felt-like materials in the form of flexible and compressible sheets, which need to be coupled with a rigid support for being used in the furnace. Typically, a sheet of such felt-like material is wrapped around the susceptor for a number of turns, the susceptors thus serving as a support for the insulator.

The Applicant has however observed that the above felt-like insulating materials may pose some problems. In particular, as these felt-like materials are in the form of sheets which are wrapped around the susceptor for a number of turns, the disposition of said insulator around the susceptor shall be carefully accomplished, in order to maintain the highest uniformity in the insulating layer. In addition, during wrapping of the sheet around the susceptor, felt-like materials may release particulate matter which, at the high temperatures of the drawing process, may contaminate the optical preform or optical fiber. The Applicant has observed that, by increasing the dimensions of the furnace, as enhanced insulation performances would be required for the insulating layer, the above number of wrapping turns of insulating sheet should be increased, with the result of the above problems becoming more evident. In addition, it has also been observed that when substitution of the susceptor becomes necessary, e.g. because of consumption of the same upon use, also the insulator wrapped thereon should be removed and a new one re-wrapped around the new susceptor. Problems in keeping substantially constant the properties of the susceptor-insulator assembly may thus arise.

The Applicant has now observed that turbulence in the flow of conditioning gas can be reduced, in particular when relatively high flow rates are employed, by controlling the inlet flow of conditioning gas inside the drawing furnace as well as by suitably conforming the top and the bottom chimney connected to said furnace.

Applicant has thus developed an induction furnace, particularly adapted for drawing large preforms (more than 80 mm and up to about, e.g., 130 mm in diameter), that provides a substantial control over turbulence in the flow of conditioning gas through the furnace and turbulence caused by unwanted intrusion of ambient atmospheric gases. Said furnace is in particular a graphite induction furnace.

A method and a furnace according to the present invention allows drawing preforms of larger diameter than conventional ones, therefore reducing the number of times that the furnace must be shut down to insert a new preform and increasing the amount of drawn fiber from a single preform, eventually reducing the costs of the drawing process.

In addition, use of a particular insulating material for a furnace according to the present invention allows improvements in terms of construction, maintenance and constancy of performance of the furnace.

One aspect of the present invention thus relates to a method for drawing an optical preform of large diameter into an optical fiber or into a preform of smaller diameter, said method comprising the steps of:

introducing said optical preform into a drawing furnace through a top chimney connected to said furnace;

mechanically sealing the upper portion of said top chimney;

heating the bottom end of said preform into the furnace to its softening temperature;

introducing a flow of conditioning gas into said top chimney;

wherein the step of introducing the flow of conditioning gas comprises imparting a downward angled direction to said flow of conditioning gas entering said top chimney.

Preferably, said downward angled direction forms an angle of less than about 45° with respect to the longitudinal axis of the drawing furnace, preferably from about 40° to about 20°, an angle of about 30° being particularly preferred.

Preferably, said flow of conditioning gas is annular.

According to a preferred embodiment, the above furnace further comprises a bottom chimney connected to the bottom of said furnace and said method comprises the further step of:

allowing said gas to flow from said furnace body to said bottom chimney and then outside from said furnace, the speed of the conditioning gas in at least a lower portion of said bottom chimney having a gradient substantially constant or slightly increasing.

Preferably, the increment of the velocity of the gas within said lower portion is from about $1/10$ to about $1/100$ per mm of height of said lower portion with respect to the velocity of the gas entering into said lower portion.

Another aspect of the present invention relates to a drawing furnace for drawing an optical preform into an optical fiber or into another preform having a smaller diameter, said furnace comprising:

a furnace body having an upper end and a lower end and comprising at least a susceptor, an induction coil and an insulating material disposed between said susceptor and said induction coil; and a top chimney connected to the upper end of said furnace body, said top chimney comprising a mechanical seal for avoiding inlet of ambient air into the furnace;
wherein said top chimney comprises on its upper portion a distributor body through which conditioning gas is uniformly introduced into the top chimney and forcedly directed in a downward direction towards said furnace body.

According to a preferred embodiment, said distribution body comprises:

an annular distribution chamber;
a downward-angled annular outlet connected to said annular chamber and in fluid communication with the top chimney interior;

said annular outlet defining a downward-angled flow path from the top chimney interior towards the heating zone of the furnace.

Preferably, said annular outlet is downward-angled of an angle α of less than about 45° with respect to the longitudinal axis of the furnace, preferably of from about 40° to 20°, an angle of about 30° being particularly preferred.

Preferably, a feed duct leading from a source of conditioning gas to said annular chamber is tangentially disposed with respect to said chamber.

According to a particularly preferred embodiment, a plurality of fins is radial disposed within the annular outlet.

Optionally, a porous filter can be provided inside the distributor body and interposed between the annular distribution chamber and downward-angled annular outlet.

The top chimney of a furnace according to the invention may also optionally include a support collar apt to receive and firmly hold one end of the optical preform or of a mother rod connected to said preform contained into the furnace. Preferably, said support collar is free to slide atop the distributor body. Preferably, a substantially ring-shaped resilient seal is provided on the interior wall of the support collar, said seal preventing ambient atmosphere from entering into the furnace while allowing the preform or the mother rod to be removed from the interior of the furnace through said support collar without sticking to said seal. In particular, said seal defines a seal height and comprises a seal seat having a seat height, and two opposing seal walls, each of which extends from the seal seat, such that the ratio of the seat height to the seal height is less than about 2, preferably from about 2 to about 1.4. Preferably, said two opposing walls have both a thickness of about 1 mm.

Another aspect of the present invention relates to a drawing furnace for drawing an optical preform into an optical fiber or into another preform having a smaller diameter, said furnace comprising:

a furnace body having an upper end and a lower end and comprising at least a susceptor, an induction coil and an insulating material disposed between said susceptor and said induction coil; and a bottom chimney connected to the lower end of said furnace;
said bottom chimney comprising a lower portion tapered in the form of a substantially frusto-conical shaped nozzle, wherein the walls of said frusto-conical nozzle are angled of from about 12° to about 15° with respect to the longitudinal axis of the furnace.

Preferably said angle is of about 14°.

According to a preferred embodiment, said frusto-conical nozzle has a height of from about 200 mm to about 300 mm.

In particular, said bottom chimney is particularly adapted for being connected to the lower end of a furnace body comprising the above described top chimney.

According to a preferred embodiment, said frusto-conical shaped nozzle is provided at its bottom end with a shutter portion connected to the bottom end of said nozzle, defining an exit aperture that is adjustable to control the size of the exit aperture.

The bottom chimney of a furnace according to the invention may optionally include, either as a whole or only in the portion with a decreasing cross-sectional area, an inner wall and an outer wall, which together define a cooling space, through which cooling fluid is circulated to cool the interior of the bottom chimney surrounded by said cooling space.

Another aspect of the present invention relates to a drawing furnace as above defined further comprising an insulator being a substantially cylindrical layer made of a rigid graphite material and capable of withstanding its own weight without collapsing onto the susceptor. Preferably, said rigid graphite material is comprised of graphite fibers oriented parallel to the axis of the insulating cylindrical layer. In particular, said cylindrical layer is an insulating cylinder preferably made from a single sheet of said rigid graphite material, two opposite ends of which are curved and held in contact to each other to form the cylinder. The thickness of said single sheet is preferably from about 45 to about 60 mm.

Another aspect of the present invention relates to a drawing furnace as above described characterized in that the susceptor has an inner diameter of more than 100 mm, preferably of more than 120 mm and up to about 150 mm.

In the present description, when dealing with the term "drawing furnace", it is intended that said furnace can be used either for drawing an optical preform into an optical fiber or to stretch an optical preform of large diameter (e.g. of about 120 mm) into another preform of smaller diameter (e.g. of about 50 mm).

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 10:
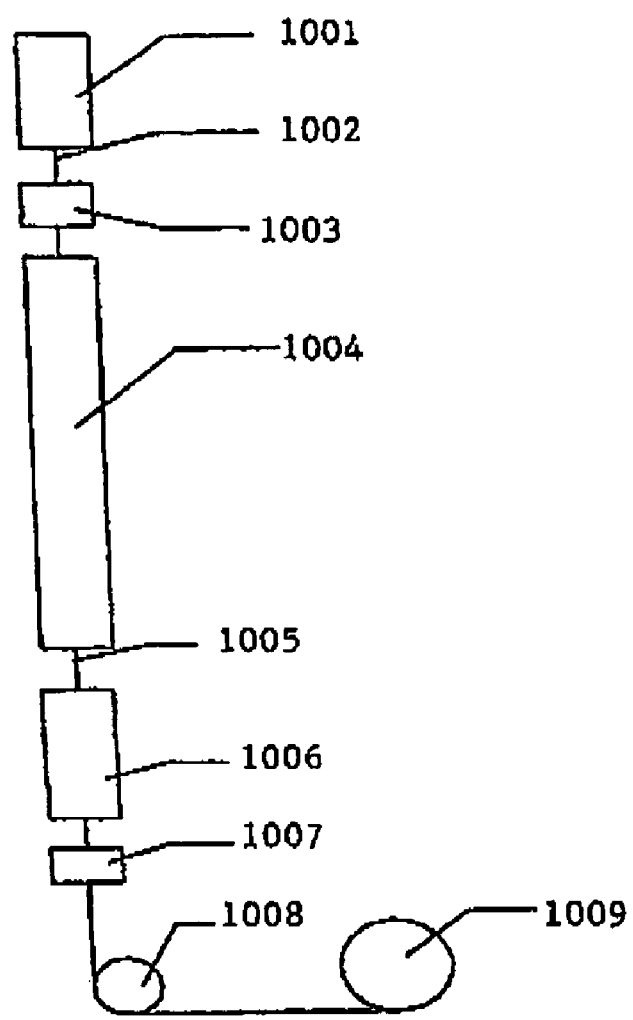
FIG. 10 is a schematic view of a drawing system for drawing an optical fiber

FIG. 10 schematically depicts a conventional system for drawing an optical fiber 1002 from an optical preform, said system being typically located onto a so-called drawing tower. The drawing system generally comprises a drawing furnace 1001, wherein the bottom of an optical preform is heated at its softening temperature, an apparatus 1003 for measuring the diameter of the drawn fiber 1002, a cooling apparatus 1004 for cooling the fiber before coating it and a coating device 1005 for applying the protective coating onto the fiber. The optical preform is generally connected to moving means for progressively moving the preform downwardly to the heating zone of the furnace while the fiber is being drawn. The coating device may comprise a coating die, containing a liquid curable resin composition (e.g. urethane-acrylate based resin), followed by a UV curing apparatus 1006 (e.g. an UV oven) and by a device 1007 for measuring the diameter of the coated fiber and the concentricity of said coating. When desired, further coating devices may be positioned after the first one, for applying further layers of different coating compositions onto the fiber.

A capstan 108 is positioned downstream from the coating device for controllably drawing the fiber from the preform, followed by a take-up wheel 109 for collecting the drawn fiber.

Figure 1:
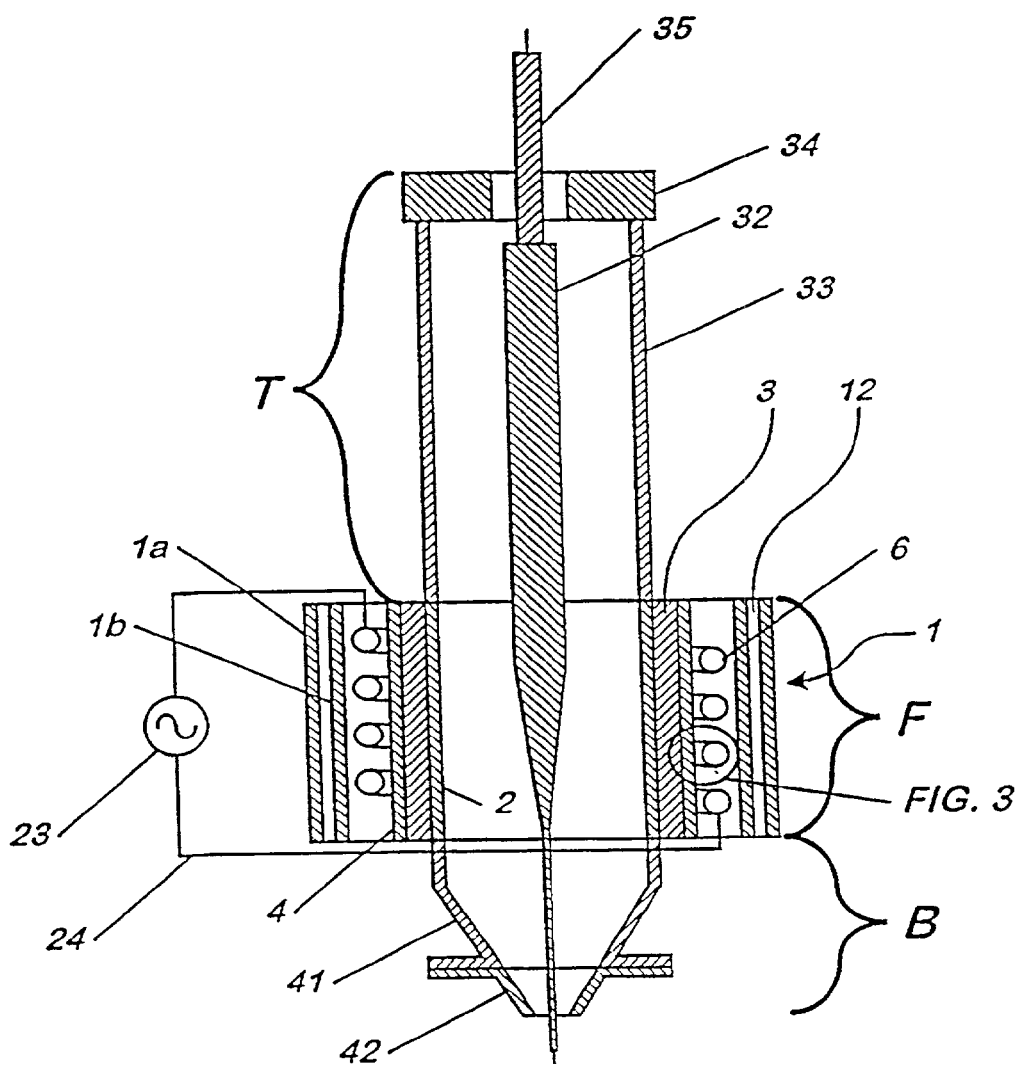
FIG. 1 is a schematic view of a graphite induction furnace according to the invention.

FIG. 1 is a high-level, schematic cross sectional view on a plane through the diameter of a furnace for drawing optical fiber according to the present invention. FIG. 1 is not to scale and does not illustrate all components of the furnace in detail. Generally, the furnace includes a furnace body F, a top chimney T and a bottom chimney B. A preform is introduced into the furnace body through the top chimney and as the preform is drawn into fiber, the fiber exits the furnace through the bottom chimney.

Figure 2:
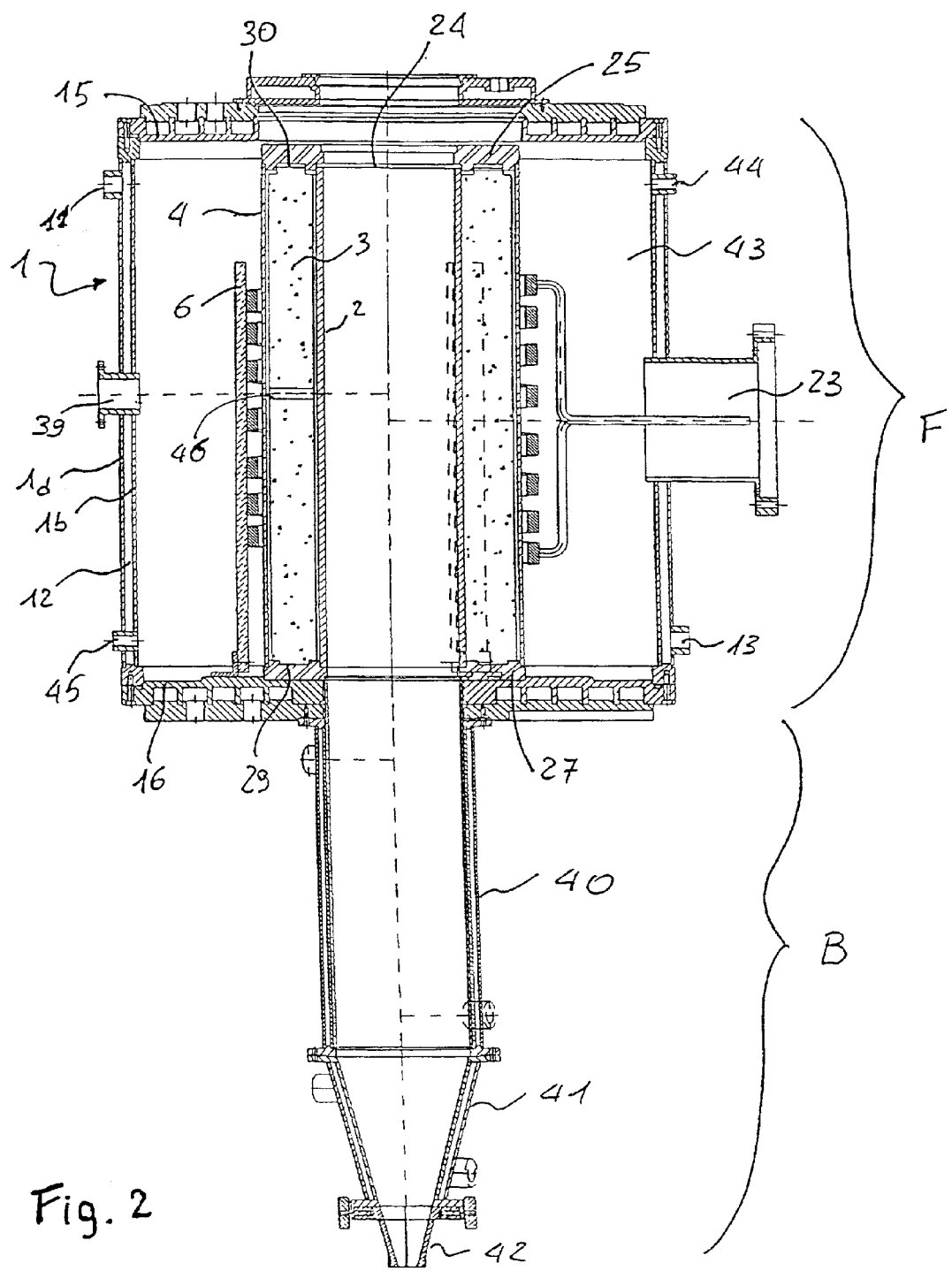
FIG. 2 is a cross-section view of a furnace body and bottom chimney of a preferred embodiment of a graphite induction furnace according to the invention taken on a plane through a diameter of the furnace.

A preferred embodiment of a furnace according to the invention is illustrated in FIG. 2, which is a detailed cross-sectional view on a plane through a diameter of the furnace. The furnace body F comprises a cylindrical susceptor 2 housed within the interior of a cylindrical insulator 3. Insulator 3 is in turn preferably housed inside a cylindrical quartz beaker 4. Two annular quartz plates 25 and 27 maintain the alignment of quartz beaker 4 around susceptor 2. A clearance, preferably of about 3-5 mm, is preferably provided between the outer surface of susceptor 2 and the inner surface of insulator 3. A similar clearance is also provided between outer surface of insulator 3 and inner surface of quartz beaker 4. The provision of these clearances allows an easier mounting of the assembly of the furnace body and easy removal and substitution of the single components of it, without interfering with the other components of the assembly.

The height of the furnace body is dimensioned so as to contain, together with the top chimney and the bottom chimney, the whole length of the preform. The height of the furnace body should be sufficiently extended so to heat the lower end of the preform in order to draw an optical fiber from it, but sufficiently reduced so to avoid unnecessary overheating of the remaining portion of the preform. For instance, a height of from about 600 to about 850 mm can be used, preferably of about 750 mm.

Coil 6 surrounds quartz beaker 4, being positioned at a distance of about 5-6 mm from the outer surface of quartz beaker 4. Coil 6 generates an electric field, which in turn generates eddy currents and thus heating in susceptor 2 to temperatures as high as about 2200° C. All these major components, coil 6, quartz beaker 4, insulator 3 and susceptor 2 are enclosed within housing 1.

Housing 1, which can be made of metal, e.g. copper, brass or, preferably, aluminum, is closed on the top and bottom ends by annular end plates 15 and 16, each having a centrally located aperture. These end plates and housing 1 may be made, for example, of aluminum. The apertures in the end plates mate with top chimney T and bottom chimney B. The end plates and the internal wall 1b of housing 1 define a furnace interior.

In the embodiment illustrated in FIGS. 1 and 2, housing 1 includes two walls, exterior wall 1a and interior wall 1b, which together define an annular cooling cavity 12. In the embodiment shown, external wall 1a has an outside diameter of 620 mm diameter, and internal wall b has an outside diameter of 580 mm. The height of housing 1 is about 740 mm. To cool external housing 1, a cooling fluid flows through cooling cavity 12. For instance, the space between walls 1a and 1b is cooled by a flow of water. Cooling water enters cavity 12 via a plurality of water supply pipes 11. For example, three supply pipes 11 may be distributed around the perimeter of housing 1 at 120° intervals. Water is then discharged from cavity 12 through discharge pipes 13. Preferably, the numbers of supply pipes 11 and discharge pipes 13 are equal and supply pipes 11 and discharge pipes 13 are located on opposing sides of housing 1 so that cooling water uniformly cools housing 1.

Coil 6 is electrically connected to a source of high-frequency electric current (not shown) through passage 23. Current levels in coil 6 can lead to significant levels of resistive heating. To control such heating, coil 6 may be made, for example, of copper tubing so that a cooling fluid, such as water, can be circulated through the coil 6 during operation of the furnace. The electrical field generated by the current flowing through coil 6 induces eddy currents in susceptor 2. A conditioning gas, for instance nitrogen, is preferably flown into space 43 where coil is housed, to preserve insulator and/or the susceptor from possible oxidation. Typical flow rates of this gas are from about 20 to about 30 l/min. Supply pipes 44 and discharge pipes 45 are provided onto housing 1, e.g. in the same manner as described for pipes 11 and 13, for allowing the flow of said gas into housing 1.

Figure 9:
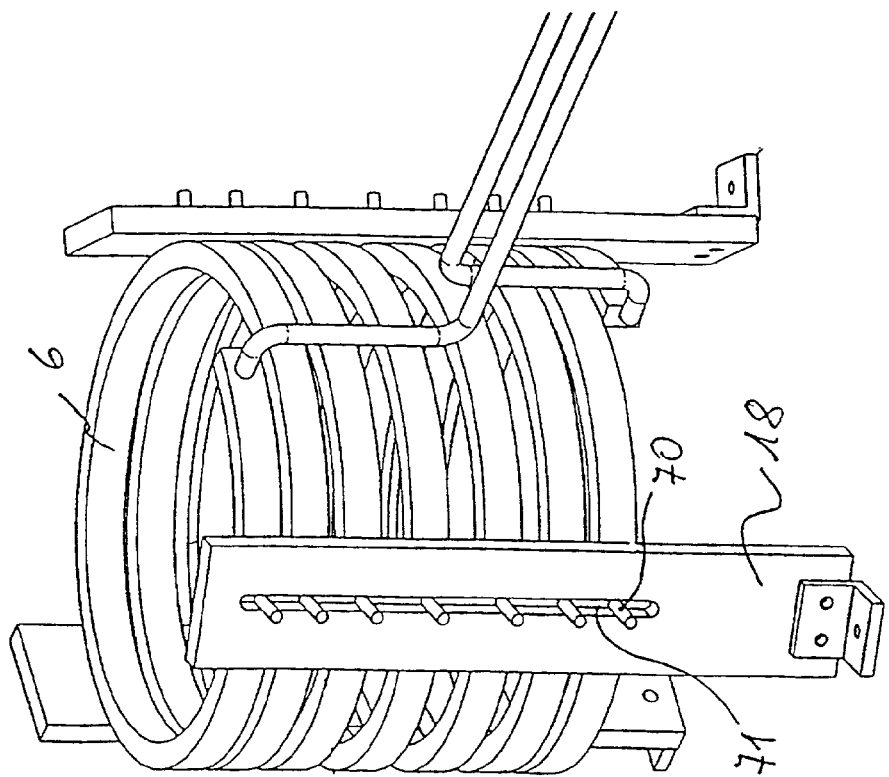
FIGS. 8 and 9 show two alternative embodiments of an induction coil to be disposed within the furnace.
Figure 8:
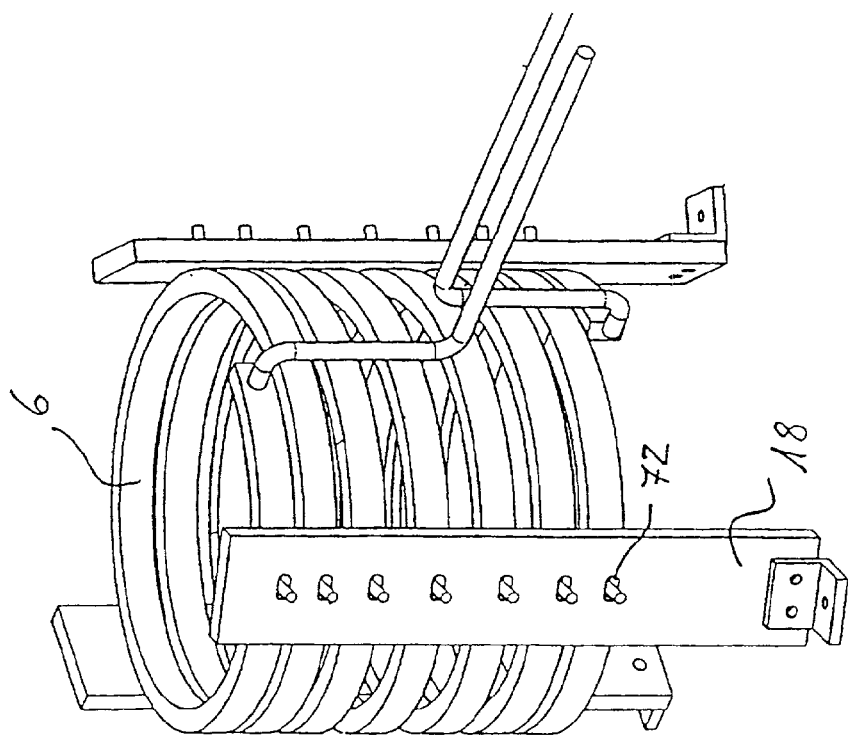

The structure that supports coil 6 inside housing 1 should not conduct significant electrical current. In the embodiment shown in FIG. 9, three legs 18 made of insulating ceramic material are distributed within housing 1 at 120° intervals to support coil 6 adjacent quartz beaker 4 (not shown in FIG. 9). After coil 6 has been centered inside the furnace by fixing coil supports 18, the central axis of the coil 6 is precisely aligned with respect to the central axis of the furnace by acting on pins 70 which are inserted into corresponding vertical slots 71 provided onto support 18; once the correct alignment has been accomplished, the coil is fixed in such position by fixing each pin onto support 18, e.g. by means of nuts. Alternatively, as shown in FIG. 8, the vertical slots in supports 18 can be replaced by a series of horizontal slots 72, each disposed at the appropriate height where the coil turn pin is supposed to stay. With this latter embodiment mounting and alignment operation are generally easier and the centering of the coil is quite more precise and constant in time.

Susceptor 2 of a furnace according to the present invention is typically made of graphite. In particular, the graphite susceptor material should have a relatively high thermal conductivity, preferably higher than about 50 W/m·° K, e.g of about 100 W/m·° K, and a relatively low specific resistance, preferably of about $1.0 \cdot 10^{-5}$ ohm·m, or lower. The thermophysical and electrical properties of a preferred susceptor material commercialized under trademark Grede IG110 by Morganite are summarized below in Table 1.

TABLE 1

Thermophysical and Electrical Properties of Susceptor Material

| Bulk density | 1.77 | $g/cm^3$ |
|---|---|---|
| Thermal conductivity | 100 | kcal/m hr ° C. |
| Specific resistance | 1100 | µohm · cm |
| Ash content | 20 | ppm |
| Porosity | 17 | % |

In the preferred embodiment, susceptor 2 is about 6 mm thick with an inside diameter of 150 mm, making it compatible with large preforms (up to about 130 mm in diameter).

A conditioning gas is provided from the top chimney inside the cylindrical susceptor, for providing a controlled heating atmosphere inside the furnace and preserving susceptor's surface from possible oxidation due to accidental inlet of air from the outside of the furnace. Any inert gas may be suitable as a conditioning gas including, but not limited to, helium, argon, and nitrogen, with helium preferred. Typically, said conditioning gas is flown inside the furnace at a flow rate of from about 15 l/min to about 20 l/min. Said conditioning gas diffuses through susceptor into the gap provided between susceptor and insulator and then permeates the insulator. Due to the reduced width of said gap, the conditioning gas disposed within said gap is substantially stationary, i.e. no substantial forced flow of gas is caused to take place within this gap.

Insulating material suitable for a furnace according to the present invention may also be graphite-based materials, for improving compatibility between susceptor and insulator. Insulating materials differ mainly in density (or porosity), thermal conductivity and resistivity from graphite based materials employed for the susceptor. In particular, density of graphite insulating materials is lower than about 0.4 $g/cm^3$, preferably lower than about 0.2 $g/cm^3$ (compared with a typical density of at least 1.5 $g/cm^3$ of graphite susceptor materials). Related to the lower density of the insulating materials is their higher apparent porosity, which is higher than about 70%, preferably higher than about 85% (compared with typical values of porosity of susceptor materials of about 20%). Due also to the relatively high porosity, said graphite insulating materials have good insulating properties. The thermal conductivity of these materials is relatively low, as compared with the one of susceptor materials. In particular said thermal conductivity is typically lower than about 1.5 W/m·° K, preferably lower than about 1.2 W/m·° K in argon atmosphere at 2000° C., and lower than about 0.6 W/m·° K, preferably lower than about 0.4 W/m·° K in argon atmosphere at 400° C. In order to limit possible electromagnetic coupling with the coil, the graphite insulating material should have a specific resistance substantially higher than the specific resistance of susceptor, preferably of about $1.0 \cdot 10^{-3}$ ohm·m, or higher.

Commercial carbon or graphite felts can be used as insulating materials in a furnace according to the present invention, such as those commercialized, for instance, by SGL (e.g. Sigratherm KFA5 or KFA10) or by Union Carbide (e.g. National Grade VDG, Grade WDF or Grade GRI-1). As previously said, these felt-like materials are in the form of flexible sheets which need to be coupled with a rigid support. Typically, a sheet of such felt-like material has a thickness of about 5-10 mm and is wrapped around the susceptor for a number of turns sufficient to impart the desired insulating properties, the susceptor being thus employed as a support for the insulator.

Advantageously, for the insulator of a furnace according to the present invention, a rigid graphite insulating material is preferably used, said material having a sufficient stiffness for being easily shaped into a self-standing cylinder. These materials are typically comprised of graphite fibers, the majority of which is disposed parallel to each other along a preferred direction. In order to be sufficiently stiff and withstand its own weight, said material should have a compression modulus of at least 0.1 Mpa in the longitudinal direction of the fibers, preferably of at least about 0.5 Mpa and up to about 10 Mpa, a compression modulus of about 1 Mpa being particularly preferred. Typically, the insulating cylinder is made from a single sheet of the desired thickness. The sheet is curved to form a cylinder and the two opposite ends of the curved sheet are held in contact to each other, e.g. by means of welding or sewing. The thus obtained insulating cylinder is able to withstand its own weight without collapsing onto the susceptor, thus allowing to maintain the desired gap (preferably about 3-5 mm) between insulator and susceptor. In case when substitution of the susceptor cylinder is necessary, e.g. because of consumption of the same, said susceptor may be easily removed from the furnace body without altering the whole geometry of the structure, thus leaving the insulating cylinder in place.

Examples of suitable materials with the desired characteristics are Sigratherm PR-200-16, PR-201-16 or PR-202-16 (from SGL), CBCF® (Carbon Bonded Carbon Fiber) made by Morganite and UCAR Graphite RIGID Insulation made by Union Carbide. A preferred material for insulator 3 is CBCF®. CBCF® is rigid, of uniform porosity, easily machined and assembled. As previously mentioned, these materials are comprised of graphite fibers disposed parallel to each other along a preferred direction. In the embodiment of the present invention, the material is formed into a cylinder in such a way as to cause the graphite fibers to be mainly disposed parallel to the axis of the insulating cylinder.

A rigid graphite insulating cylinder according to the invention has a thickness of from about 45 to 60 mm and an inner diameter of from about 150 to about 160 mm. According to the preferred embodiment the thickness is about 52 mm and the internal diameter is about 156 mm. In the following table 2, some properties of a preferred insulating are given.

TABLE 2

Thermophysical and Electrical Properties of CBCF ® Insulator

| | |
|---|---|
| Density | 0.17 ± 0.02 g/cm$^3$ |
| Thermal conductivity | 0.55 W/mK (0.50 Kcal/Mh ° C.) at 1000° C. in Ar |
| Electrical resistivity | 1.10 × 10$^{-3}$ Ωm (parallel to fibre orientation) 4.07 × 10$^{-3}$ Ωm (perpendicular to fibre orientation) |
| Ash content | <0.07% |
| Porosity | 89% volume |
| Compressive strength | 1.10 Mpa (parallel to fibre orientation) |
| Flexural strength | 1.03 Mpa (parallel to fibre orientation) |

Quartz beaker 4 is a cylindrical quartz tube with an external diameter of about 265-285 mm, about 275 mm in the illustrated embodiment, and is disposed to surround insulator 3 and separate the conditioning gas inside the cylindrical susceptor 2 from the conditioning gas surrounding coil 6, when these are different. A horizontal quartz plate 25 having a central opening 26 and three concentric grooves in its lower surface is provided at the upper end of beaker 4. A horizontal quartz plate 27 also having a central opening 28 and three concentric grooves in its upper surface is provided at the lower end of the beaker 4. The ends of susceptor 2, insulator 3 and beaker 4 are housed in the concentric grooves in plates 25 and 27 so that these components are positively and precisely positioned in relation to each other and easily singularly removable. This method of positioning susceptor 2, insulator 3 and beaker 4 ensures consistent performance from one furnace to another. In the central grooves of the two plates 25 and 27, are inserted annular ridges 29 and 30 formed on the ends of insulator 3. Annular ridges 29 and 30 concentrically align insulator 3 around susceptor 2. The ends of susceptor 2 are housed within the innermost concentric groove of the two plates 25 and 27.

A hole 46 is made through beaker 4, insulator 3 and housing 1 to enable measurement of the temperature of the outer surface of susceptor 2 using a pyrometer set introduced into the furnace through passage 39. Due to the machinability of insulator 3, it is very easy to pierce it. The temperature measured by the pyrometer is used as a feedback parameter to control the power supply of the furnace.

Figure 3:
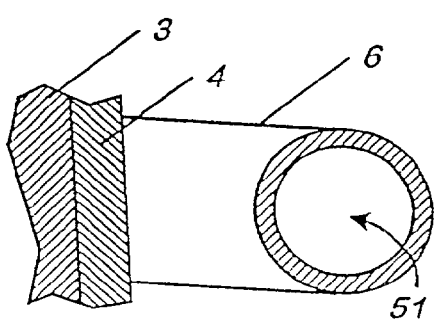
FIG. 3 is a detail, cross-section view of a portion of an induction coil of the graphite induction furnace shown in FIG. 2 taken on the same plane as the cross-section of FIG. 2.

FIG. 3 shows a section of coil 6, in which the hollow character of coil 6 is apparent as aperture 51. Cooling water flows through coil 6 in order to control the temperature of coil 6 below the melting point of the material of which it is made.

Figure 4:
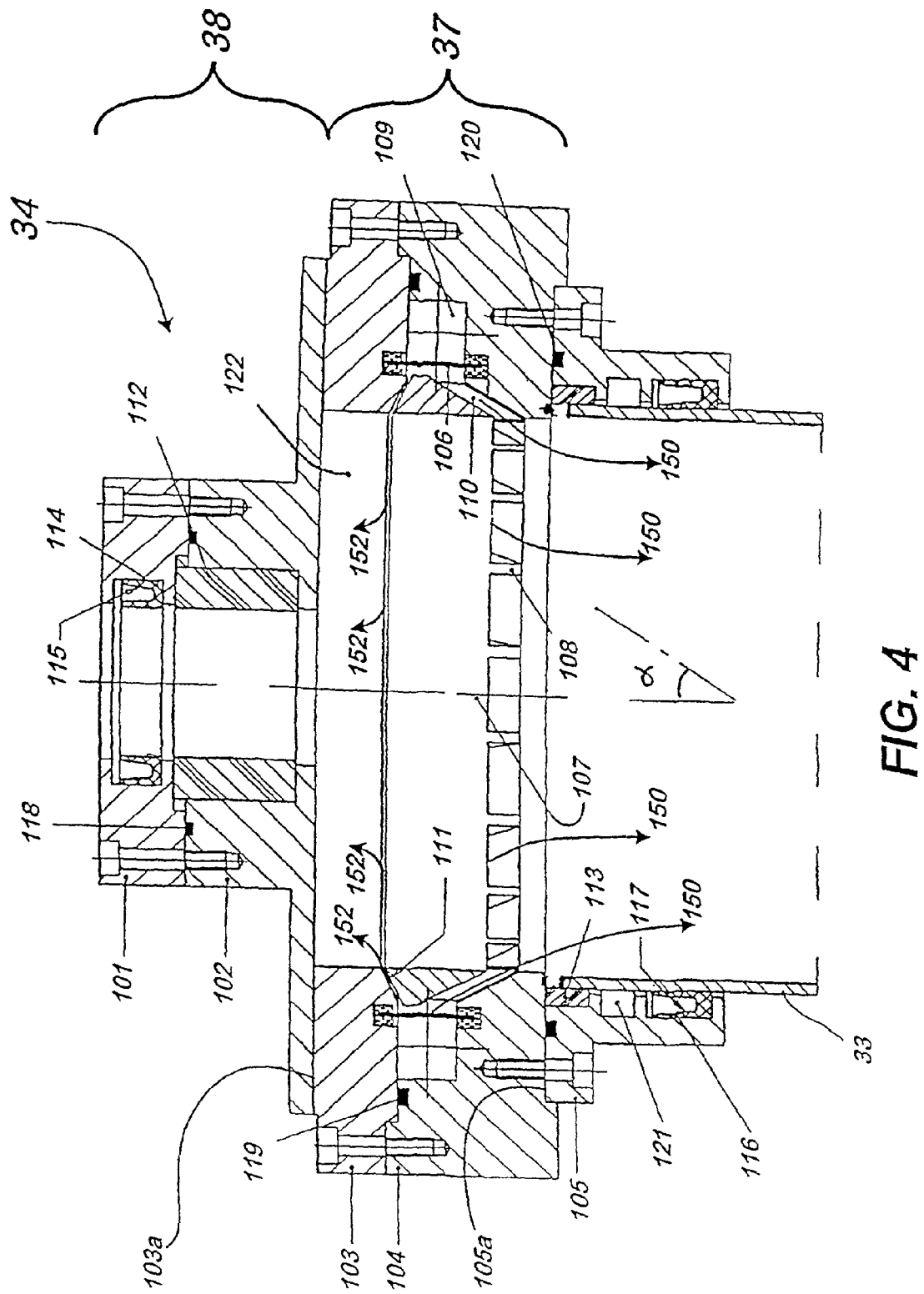
FIG. 4 is a cross-section view of a preferred embodiment of a top chimney for the graphite induction furnace shown in FIG. 2 taken on the same plane as the cross-section of FIG. 2.

FIG. 4 is an elevational cross-section of top chimney T through a plane containing a diameter of chimney T. As shown in FIG. 1, top chimney T provides an appropriate thermal and chemical environment for preform 32, which is supported by mother rod 35 during the preparation of preform 32 for drawing before it enters furnace body F. Rod 35 connects to preform 32, for example, with a hook and latch device or a pin-junction apparatus. As seen in FIGS. 1 and 4, top chimney T comprises quartz muffle 33, into which preform 32 is introduced. Quartz muffle 33 is preferably long enough to surround the entire preform 32 during the initial phase of the process when only the bottom end of preform 32 is adjacent the hottest part of susceptor 2.

The diameter of quartz muffle 33 is preferably substantially equal to the diameter of susceptor 2, e.g. 150 mm in the illustrated embodiment. Equal diameters for muffle 33 and susceptor 2 minimizes turbulence in the conditioning gas because muffle 33 and susceptor 2 form a smooth inner wall.

As seen in FIG. 1, an annular distributor 34 is disposed atop muffle 33. The annular form of distributor 34 allows to uniformly introducing the flow of conditioning gas into the furnace. Any inert gas may be suitable as a conditioning gas including, but not limited to, helium, argon, and nitrogen, with helium preferred. Use of such a conditioning gas ensures an inert, non-reactive atmosphere inside the susceptor 2 of furnace body F, the top chimney T and the bottom chimney B.

FIG. 4 is a detailed, cross-section view of distributor 34 taken along a plane containing a diameter of distributor 34. Distributor 34, is a generally cylindrical body defining an interior that is substantially sealed around mother rod 35 at the top and around muffle 33 at the bottom. Conditioning gas is introduced into the interior where the gas flows downward inside the susceptor of furnace body F and out of bottom chimney B. Distributor 34 can be made primarily of stainless steel or preferably of aluminum.

Figure 5:
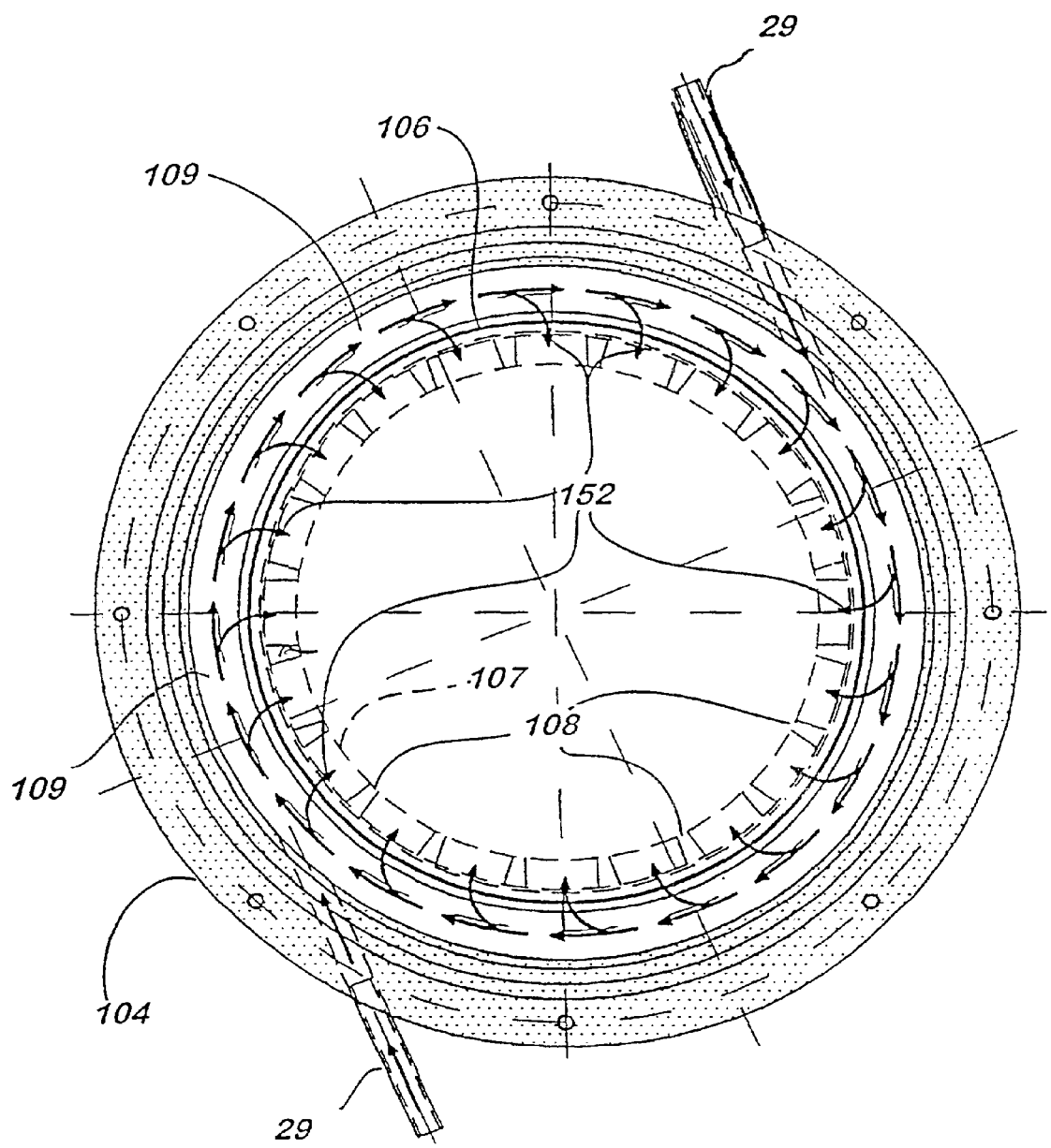
FIG. 5 is a cross-section view of the top chimney of FIG. 4 taken on a plane perpendicular to the plane on which cross-section view of FIG. 4 is taken.

In the embodiment shown in FIGS. 4 and 5, distributor 34 comprises attachment collar 105, conditioning gas distributor body 37 and support collar 38 for supporting mother rod 35 during operation of the furnace. Attachment collar is attached around muffle 33 and includes a top surface 105a to which conditioning gas distributor body 37 is attached. A seal 116 is provided on the attachment collar, in contact with muffle 33.

Conditioning gas distributor body 37 includes distributor casing top 103 having an upper surface 103a on which support collar 38 slidably rides during operation of the furnace. Attachment collar 105, conditioning gas distributor body 37, and support collar 38 are described in further detail below.

Distributor casing bottom 104 of conditioning gas distributor body 37 is attached to attachment collar 105 via screws. Distributor casing top 103 is connected to distributor casing bottom 104 with screws. A distribution ring 107 is located between distributor casing bottom 104 and distributor casing top 103, said distribution ring 107 leaning on distributor casing bottom 104 through its fins 108. Annular distribution chamber 109 is formed between distributor casing bottom 104 and attachment collar 105.

Referring to FIG. 5, which is a cross-sectional plan view of distributor 34, conditioning gas (coming from an external feeding system not shown) is fed into distribution chamber 109 through two ducts 29. Ducts 29 are tangentially disposed with respect to distribution chamber 109. The tangential entrance of ducts 29 allows conditioning gas to enter distribution chamber 109 with little turbulence. Distribution chamber 109 acts as a reservoir which eliminates irregularities in gas flux entering chamber 122.

If desired, a porous filter 106 can be provided as an inner wall inside distribution chamber 109. Before entering chamber 122, conditioning gas thus passes through said optional filter 106, said filter further improving uniformity of the flux of conditioning gas. A suitable filter for being used as filter 106 includes, but is not limited to, a filter made of metallic fibers, the FIBERMET AO Series, by MEMTEC (Memtec Applied Mechanics, 1750 Memtec Drive, Deland, Fla., USA).

After the conditioning gas has passed through optional filter 106, distribution ring 107 smoothly diverts its flow. The conical lower surface of distribution ring, together with distribution casing bottom 104, forms a downward-angled annular channel 110 through which the conditioning gas flows along paths 150. Thus, the flow of conditioning gas turns downward toward muffle 33. In order to minimize turbulence in the flow of conditioning gas, the applicant has observed that annular channel 110 should be angled of an angle α of at least 45° with respect to the longitudinal axis of the furnace, preferably of from about 40° C. to about 20°, an angle α of about 30° being particularly preferred. If angle α is higher than about 45°, the flow of gas would not be sufficiently downward directed, thus possibly causing, in particular at high flow rates, undesirable gas turbulence due to an excessively high radial component of the gas flow entering the top chimney. On the other side, an angle of 0° (i.e. with an axial flow of gas, i.e. parallel to the longitudinal axis of the furnace) would be desirable as regards to the kinetic of the process, but difficult to realize in terms of apparatus, as in this case the distributor body should have a reduced cross section with respect to the remaining portion of the top chimney.

The applicant has noticed that when high flow rates of conditioning gas (e.g. about 100 slm—standard liter per minute—or higher) are employed in a furnace according to the present invention having the above inlet positioned at 30° with respect to the longitudinal axis of the furnace, undesired levels of turbulence in the gas are not transmitted to the draw down zone of the preform.

Conditioning gas flows farther along paths 150 between fins 108, radial disposed within annular channel 110, preferably in correspondence of the outlet of said channel. The presence of said fins at the outlet of channel 110 contributes to substantially eliminate circumferential swirling components in the flow of gas.

Optionally, distribution ring 107 may also be conical shaped on its upper surface so that a small amount of conditioning gas can flow through the upward-angled annular path 152, defined by upper surface 111 of distribution ring 107 and distributor casing top 103, into chamber 122. This optional flow of conditioning gas 152, which should be very low in order to avoid any gas turbulence inside the top chimney, creates in the upper portion of the top chimney a buffer of gas having a pressure higher than the one of outer atmosphere thus further preventing (in addition to the mechanical seal 114 described hereinafter) ambient air from possibly entering chamber 122 and thus muffle 33.

Support flange 102 of support body 38 can slidably be moved atop upper surface 103a of distributor casing top 103. Sealing collar 101 is attached to support flange 102 with screws. Sleeve 112 is inserted into a channel on the inner surface of support flange 102. Sleeve 112 is made of a low friction material, preferably Polytetrafluoroethylene (e.g Teflon™), to reduce any friction between preform 32 and the inner surface of support body 38. The diameter of sleeve 112 is sized to hold firmly mother rod 35, which functions as a handle for preform 32, or through which preform 32 is supported during fiber drawing. Thus, support body 38 positively guides mother rod 35 and preform 32 during operation of the furnace. Support body 38 may be used to horizontally slide mother rod 35 and preform 32 during operation of the furnace in order to prevent preform 32 or mother rod 35 from hitting any part of the distributor 34 during operation of the furnace. Preforms and mother rods of different diameters may be accommodated by changing sleeve 112. Mother rod extending outwardly from support body 38 is blocked by means of, e.g., chucks (not shown) which firmly hold the preform. The preform is then moved downwardly during drawing operation for allowing a constant positioning of the melting zone of the preform inside the furnace.

Seal 114 is mounted in a channel on the inside wall of sealing collar 101. Seal 114 preserves the inert atmosphere inside the furnace. Conventional seals (e.g., EnerSeal by Advanced), which have a shallow cavity in their top surfaces, often exert too strong a sealing force on mother rod 35 or on preform 32. When such conventional seals are used, it may happen that by lifting the preform 32, the support body 38 may be firmly held in contact with said preform through said seal and lifted upwards with respect to the conditioning gas distributor body 37. Upon further lifting the preform, it may happen that such support body is suddenly released by said seal so that it falls onto conditioning gas distributor body 37, thus possibly damaging underlying distributor body 37.

Figure 7:
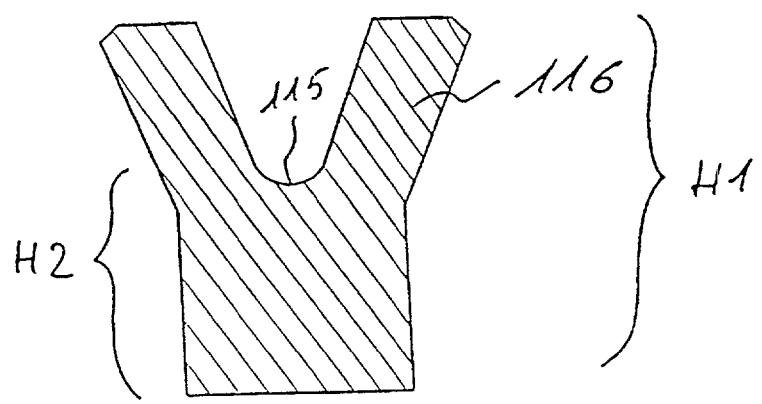
FIG. 7 is a cross-section view of a preferred embodiment of a seal to be used in the above top chimney.

Seal 114 is designed to exert sufficient sealing force onto mother rod 35 or preform 32 to prevent the ambient atmosphere from entering chamber 122. However, seal 114 is more resilient in the radial direction than conventional seals so that mother rod 35 or preform 32 may be smoothly withdrawn from support body 38 without sticking between mother rod 35 or preform 32 and seal 114. The added resilience of seal 114 is achieved by adopting a seal with a Y-shaped profile, as shown in FIG. 7, where seat 115 forming the Y-shaped profile in seal 114 is deeper than in conventional seals. In particular, when the thickness of the seal walls 116 is about 1 mm, the ratio of the total seal height H1 to the seat height H2 is less than about 2:1, preferably from about 2:1 to about 1.4:1. In the depicted embodiment, thickness of the walls of seal 114 is about 1 mm, the seal has a total height of about 10 mm and a height of about 5.8 mm from the seat 115 to the base of the seal. Said seal is made of an inert elastomeric material resistant to the high temperature of the furnace. Preferably a fluoroelastomer, such as Viton®, is employed.

As seen schematically in FIG. 1 and in more detail in FIG. 2, bottom chimney B is attached to the lower portion of furnace body F. Bottom chimney B includes a water-cooled cylindrical tube 40 protruding from the bottom of furnace F. Preferably, the inner part of the cylindrical tube 40 is made from a quartz tube. Cone 41, which may also be water-cooled, is connected to the lower end of cylinder 40. Conical shutter 42 is connected to the lower portion of cone 41. Shutter 42 is made of two separable halves, which can be spaced apart at the beginning of drawing operations, for allowing a larger passage for the initial glass drop coming from the preform. During the drawing process, the two halves of the shutter are positioned closely, leaving an outlet at the bottom of the bottom chimney of about 20 mm diameter.

With conventional constant cross-section bottom chimneys, possible turbulence in the conditioning gas as it flows through the bottom chimney causes undesirable oscillations in the diameter of the fiber. The conical shape of cone 41 of the end portion of bottom chimney B results in gradual changes in the cross-sectional area through which the conditioning gas flows. Thus, the velocity of the conditioning gas as it flows through bottom chimney B also changes gradually and turbulence is minimized. The smooth flow of conditioning gas through the bottom chimney minimizes unwanted oscillations in fiber diameter.

Figure 6:
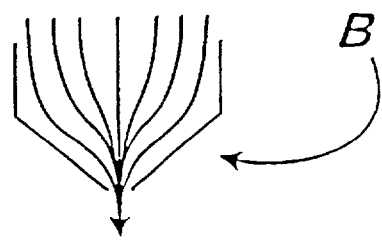
FIG. 6 is a schematic illustration of gas velocity vectors in a bottom chimney of a graphite induction furnace according to the invention.

Because shutter 42 delimits a very narrow exit passage to the conditioning gas, cone 41 is particularly suitable for reducing turbulence avoiding the formation of eddies due to gas recirculation caused by gas impinging the occluded part of the shutter. This effect is clarified with the aids of the sketch of flow paths shown in FIGS. 6 and 6A. FIG. 6 depicts the flow paths of gas flow through one embodiment of a bottom chimney according to the invention. All flow paths converge at the exit of the bottom chimney. The flow is orderly and nearly free of turbulence.

Figure 6A:
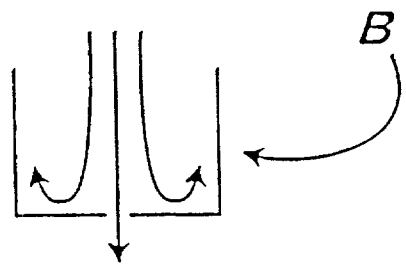
FIG. 6A is a schematic illustration of gas velocity vectors in a bottom chimney of a conventional graphite induction furnace.

FIG. 6A depicts flow paths of gas flow through a conventional bottom chimney having a substantially constant diameter along its length and a significantly smaller exit diameter at the shutter than the diameter of the chimney immediately above the shutter. As shown, eddies may be generated inside the gas flow on the lateral portions of the flow, which would lead to undesired gas turbulence inside the furnace.

As a matter of fact, the velocity of the conditioning gas flowing through conical portion 41 of the bottom chimney gradually increases, thus gradually reaching the desired outlet velocity at the exit from the bottom chimney, and no eddies are generated inside the bottom chimney. The above conical shape of said bottom chimney thus allows to impart a substantial constant or slightly increasing gradient of velocity to the conditioning gas.

Preferably, the increment of the velocity of the gas within said conical portion 41 is from about 1/10 to about 1/100 per mm of height of said portion with respect to the velocity of the gas entering into said portion. For instance, a conditioning gas entering into a conical portion of about 180 mm height with a velocity of about 0.2 m/s will have a velocity at the exit of said portion (i.e. at the inlet of the shutter 42) of about 1.25 m/s.

For generating the above gradients in the velocity of the conditioning gas, the conical end portion of the bottom chimney is angled of from about 12° to about 16° with respect to the longitudinal axis of the furnace, preferably of about 14°. Angles lower than about 12°, although more desirable for generating a much more gradual increase of the of the velocity of the conditioning gas, would however either require a too long conical portion of the bottom chimney if the outlet diameter is maintained unaltered (thus undesirably increasing the height of the drawing tower), or to increase the diameter of the outlet if the length of the conical portion is maintained unaltered (thus undesirably reducing the outlet velocity and pressure of the gas). On the other side, angles greater than about 16° can much easier create undesired eddies in the conditioning gas flowing through the bottom chimney.

When flowing through shutter 42, the conditioning gas further increases its velocity and the gradient becomes much more steep. The pressure of the gas is thus increased and this avoids undesired updraft of outside atmospheric gases into the furnace.

Conical end portion 41 of the bottom chimney has a height of from about 100 mm to about 250 mm, preferably of about 175 mm. The height of shutter 42 is from about 60 to 90 mm, preferably of about 75 mm.

Shutter 42 can slide in a direction perpendicular to the long axis of the preform in order to allow for the passage of the drop-off during drawing initial phase. When in this open position, a gap exists between halves of shutter 42. Once the drop-off has fallen through shutter 42, the halves may be slid together to form an extension of cone 41 with an opening at the bottom of shutter 42 sufficiently small to closely surround the drawn fiber.

It will be apparent to those skilled in the art that various modifications and variations can be made in the induction furnace of the present invention and in construction of this furnace without departing from the scope or spirit of the invention. For instance, the top and bottom chimney disclosed with particular reference to graphite induction furnaces can be advantageously employed also for the zirconia type induction furnaces. Other embodiments of the invention will be apparent to those skilled in the art from their consideration of the specification and practice of the invention disclosed in this document.

The invention claimed is:

1. A drawing furnace for drawing an optical preform, said furnace comprising:
    a furnace body having an upper end and a lower end and comprising at least a susceptor, an induction coil and an insulating material disposed between said susceptor and said induction coil;
    a muffle connected to the upper end of said furnace body, said muffle comprising a mechanical seal for avoiding inlet of ambient air into the furnace, said muffle being adapted to surround the optical preform before the optical preform is moved into said furnace body;
    a bottom portion connected to the lower end of said furnace and wherein said bottom portion comprising at least a lower portion with a decreasing cross-sectional area from the top to the bottom of the bottom portion in a plane perpendicular to the longitudinal axis; and
    a distributor body having a substantially annular distribution chamber, a distribution ring, and an outlet in fluid communication with an interior of the muffle, the distributor body configured to receive conditioning gas substantially tangentially with respect to the substantially annular distribution chamber, the distribution ring being adapted to uniformly introduce and forcedly direct a first portion of the conditioning gas into the muffle in a downward direction towards said furnace body and to direct a second portion of the conditioning gas to an upper portion of the substantially annular distribution chamber to create a buffer of conditioning gas having a pressure higher than a pressure outside the drawing furnace.

2. A drawing furnace according to claim 1, further comprising a feed duct leading from a source of conditioning gas to said annular chamber, said duct being tangentially disposed with respect to said chamber.

3. A drawing furnace according to claim 1, wherein a plurality of fins is radially disposed within the outlet.

4. A drawing furnace according to claim 1, wherein a porous filter is disposed inside the distributor body and interposed between the annular distribution chamber and the downward-angled outlet.

5. A drawing furnace according to claim 1, wherein a substantially ring-shaped resilient seal is provided on the interior wall of the support collar, said seal preventing ambient atmosphere from entering into the furnace while allowing the preform or the mother rod to be removed from the interior of the furnace through said support collar without sticking to said seal.

6. A drawing furnace according to claim 5, wherein said seal defines a seal height and comprises a seal seat having a seat height, and two opposing seal walls, each of which extends from the seal seat, the ratio of the seal height to the seat height being less than about 2:1, preferably from about 2:1 to about 1.4:1.

7. A drawing furnace according to claim 6, wherein said bottom portion comprises at least a lower portion tapered in the form of a substantially frusto-conical shaped nozzle that is angled from about 12° to about 16° with respect to the longitudinal axis of the furnace.

8. A drawing furnace according to claim 7, wherein said frusto-conical shaped nozzle has a height of from about 200 mm to about 300 mm.

9. A drawing furnace according to claim 7, wherein said frusto-conical shaped nozzle is provided at its bottom end with a shutter portion connected to the bottom of said nozzle, defining an exit aperture that is adjustable to control the size of the exit aperture.

10. A drawing furnace according to claim 7, wherein the bottom portion further comprises an inner wall and an outer wall, which together define a cooling space, through which cooling fluid is circulated to cool the interior of the bottom portion surrounded by said cooling space.

11. A drawing furnace for drawing an optical preform, said furnace comprising:

a furnace body having an upper end and a lower end and comprising at least a susceptor, an induction coil and an insulating material disposed between said susceptor and said induction coil;

a muffle connected to the upper end of said furnace body, said muffle comprising a mechanical seal for avoiding inlet of ambient air into the furnace, said muffle being adapted to surround the optical preform before the optical preform is moved into said furnace body;

a bottom portion connected to the lower end of said furnace and wherein said bottom portion comprising at least a lower portion with a decreasing cross-sectional area from the top to the bottom of the bottom portion in a plane perpendicular to the longitudinal axis; and a distributor body having a substantially annular distribution chamber, a distribution ring, and an outlet in fluid communication with an interior of the muffle, the distributor body configured to receive conditioning gas substantially tangentially with respect to the substantially annular distribution chamber, the distributor body including (i) at least one downwardly angled channel operable to forcedly direct a first portion of the conditioning gas into the muffle in a downward direction towards said furnace body and (ii) at least one upwardly angled path to direct a second portion of the conditioning gas to an upper portion of the substantially annular distribution chamber to create a buffer of conditioning gas having a pressure higher than a pressure outside the drawing furnace.

12. A drawing furnace according to claim 11, further comprising a feed duct leading from a source of conditioning gas to said annular chamber, said duct being tangentially disposed with respect to said chamber.

13. A drawing furnace according to claim 11, wherein a plurality of fins is radially disposed within the outlet.

14. A drawing furnace according to claim 11, wherein a porous filter is disposed inside the distributor body and interposed between the annular distribution chamber and the downward-angled outlet.

15. A drawing furnace according to claim 11, wherein a substantially ring-shaped resilient seal is provided on the interior wall of the support collar, said seal preventing ambient atmosphere from entering into the furnace while allowing the preform or the mother rod to be removed from the interior of the furnace through said support collar without sticking to said seal.

16. A drawing furnace according to claim 15, wherein said seal defines a seal height and comprises a seal seat having a seat height, and two opposing seal walls, each of which extends from the seal seat, the ratio of the seal height to the seat height being less than about 2:1, preferably from about 2:1 to about 1.4:1.

17. A drawing furnace according to claim 16, wherein said bottom portion comprises at least a lower portion tapered in the form of a substantially frusto-conical shaped nozzle that is angled from about 12° to about 16° with respect to the longitudinal axis of the furnace.

18. A drawing furnace according to claim 17, wherein said frusto-conical shaped nozzle has a height of from about 200 mm to about 300 mm.

19. A drawing furnace according to claim 17, wherein said frusto-conical shaped nozzle is provided at its bottom end with a shutter portion connected to the bottom of said nozzle, defining an exit aperture that is adjustable to control the size of the exit aperture.

* * * * *